July 2, 1963 R. E. CLARKE ETAL 3,096,100
RIDER PROPELLED VEHICLE
Filed Oct. 5, 1961

INVENTORS
Robert E. Clarke
and John C. Clarke
BY
ATTORNEY

3,096,100
RIDER PROPELLED VEHICLE
Robert E. Clarke, 450 Trappe Road, and John C. Clarke, 2903 Dunglow Road, both of Baltimore County, Md.
Filed Oct. 5, 1961, Ser. No. 143,128
4 Claims. (Cl. 280—261)

This invention relates to a child's rider propelled vehicle.

In amusement parks the whirling cups that whirl in several circles have become very popular with younger people. The present invention directed to a rider propelled vehicle also embodies a structure that will give this same excitement of whirling. The vehicle has two main bearing wheels for its support laterally and a forward steerable wheel and a rearward caster wheel which is normally off the road bed or bearing surface but the seat of the rider is so positioned relative to the main wheels that the center of gravity may be tilted or moved back to lift the front wheel and place the caster wheel on the ground. One of the main wheels only is driven from the pedals so that a spin or whirl may be obtained by the rider merely leaning or tilting back and raising the front wheel, riding on the caster wheel and rotating the driven wheel by the pedals.

Substantially the same result can be obtained from a coasting momentum if desired by tilting back on the caster wheel and continuing the rotation of the driven wheel by the foot pedals. In going into a spin after a coast due to the momentum, the spin may be obtained more rapidly and the thrill may be greater for the rider. Another object of the invention is to make the seat adjustable fore and aft of the vehicle so that the center of gravity may be adjusted somewhat in accordance with the length of the legs of the rider. Other objects and advantages of the invention will be apparent from the following description and the accompanying drawings forming a part hereof and in which:

Figure 1:
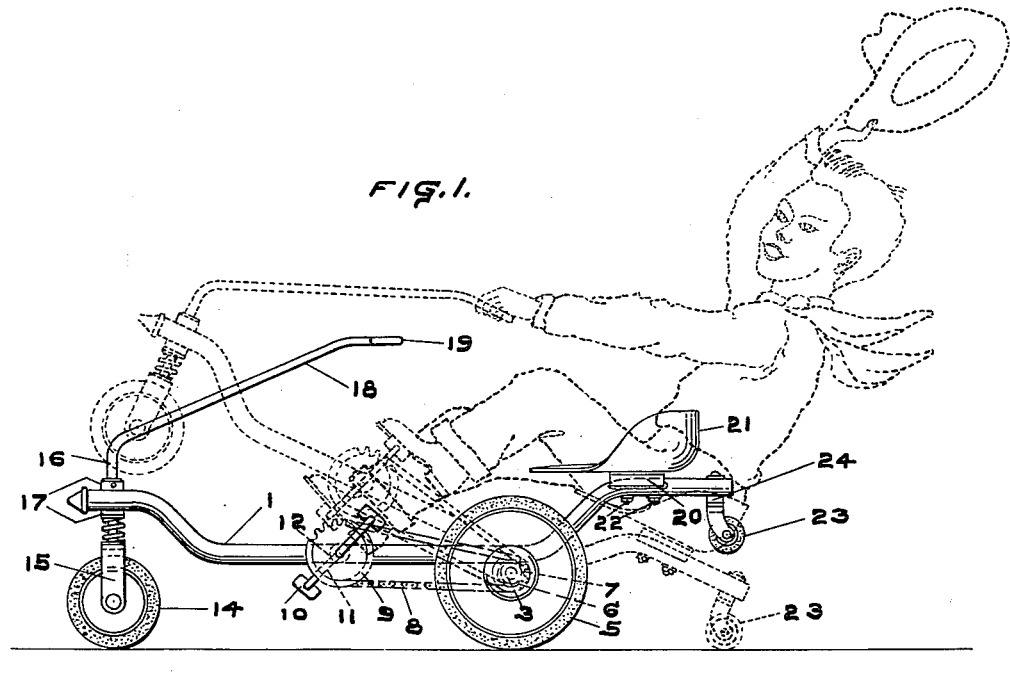
FIGURE 1 is a side elevational view of the vehicle with the steerable wheel in road engagement and as shown in dotted lines, with the caster wheel in road engagement.
Figure 2:
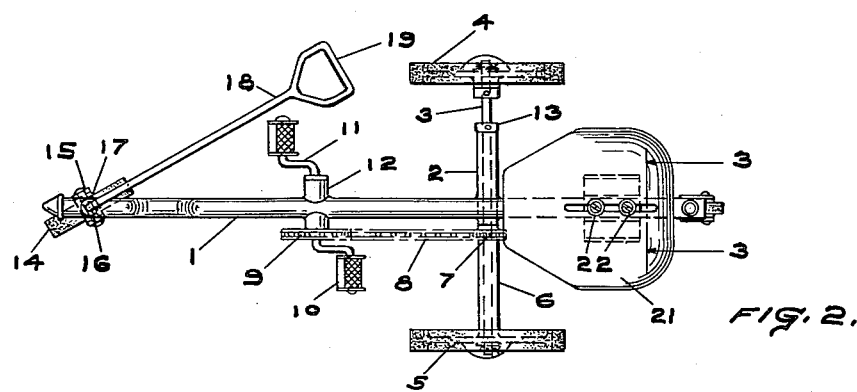
FIGURE 2 is a top plan view of the vehicle.
Figure 3:
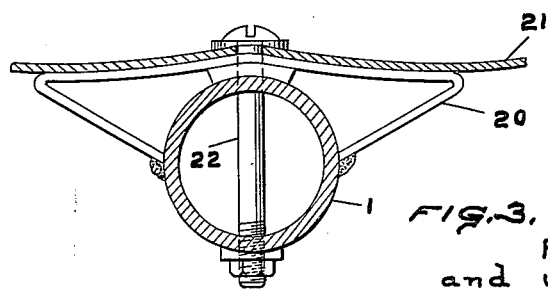
FIGURE 3 is a transverse sectional view on line 3—3 of FIGURE 2.

In the drawings similar numerals refer to similar parts in the several views. The longitudinal frame comprises a single bar 1 welded intermediate its length to a tubular member 2 projecting from one side of bar 1 and in which rotates freely an axle 3. The axle 3 has at one end a main bearing wheel 4 and at the other end a main bearing wheel 5 which is rigidly connected to the tubular member 6 on the axle 3 and which is driven through sprocket 7 by chain 8 and sprocket 9 and pedals 10 on crank bar 11 in tubular bearing member 12 which is welded into the tubular bar member 1. The axle 3 has a collar 13 rigidly affixed thereto to hold the axle properly spaced with the tubular bar member 1 at its center. In the construction shown, wheel 4 rotates freely on axle 3. A steerable wheel 14 is mounted in the fork 15 and rod 16 rigid with the fork, passes through bearings 17 rigidly affixed to the front of the frame bar 1. The rod 16 is bent into a handle section 18 having handle 19 at its extremity.

To the rear of the axle 3, the longitudinal bar member 1 has welded thereto a seat brace 20 to which the seat 21 may be attached by bolts 22 in adjusted longitudinal positions along the bar 1.

At the rear of the vehicle is a caster wheel 23 which rotates horizontally freely in the bearing 24 affixed in the end of bar member 1.

It will be apparent from this description that the vehicle will maintain a straight or guided course as propelled by the pedals 10 under the influence of the steerable wheel 14 when that wheel is on the roadway. However, when the rider tilts backward to lift that wheel from the roadway and the caster wheel strikes the roadway, the vehicle will go in a circle or whirl if the driven wheel 5 is still driven. But if the vehicle has no momentum then operation of the driven wheel 5 will still drive the vehicle in a circle on the caster since the wheel 4 is not driven by the pedals, but possibly a smaller circle.

It will be apparent that a vehicle is provided by the construction described which will give not only the satisfaction of a pedal driven steerable vehicle for the child but one which will give the thrill of rapid whirling or swinging in a circle when the caster is lowered to the ground by tilting the steerable wheel from the ground and it will also be apparent that many changes may be made in the construction precisely described without departing from the spirit of the invention.

What is claimed as new and is desired to be secured by Letters Patent is:

1. A tiltable rider propelled vehicle, a longitudinal frame, an axle thereon, transverse of and near the rear thereof, a main wheel on each end of the axle, a steerable wheel on the front of the frame, a seat on the frame rearwardly of the axle, a steering handle connected to the steerable wheel and extending rearwardly over the frame to adjacent the seat, means to drive one of said main wheels, while the other rotates freely, a caster wheel on the rear of the frame spaced upwardly from road contact relative to the other wheels, giving a third point support for the vehicle and a rider thereon when tilted back, to raise the steerable wheel from road contact for movement of the vehicle in a circle by the driving means.

2. The vehicle of claim 1 including means to adjust the longitudinal position of the seat on the frame.

3. A tiltable rider propelled vehicle, a longitudinal frame, an axle thereon transverse of and near the rear thereof, a main wheel on each end of the axle, one of which rotates freely, a steerable wheel on the front of the frame, a seat on the frame rearwardly of the axle, a steering handle connected to the steerable wheel and extending rearwardly over the frame to adjacent the seat, foot engaging cranks rotatably mounted on the frame between the steerable and main wheels, drive means connecting said cranks to the other one of said main wheels, a caster wheel on the rear of the frame spaced upwardly from road contact relative to the other wheels, giving a third point support for the vehicle and a rider thereon when tilted back, to raise the steerable wheel from road contact for movement of the vehicle in a circle by the driving means.

4. A tiltable rider propelled vehicle, a longitudinal frame, an axle mounted transversely thereon adjacent the axle longitudinal center, a main wheel on each end of the axle, a steerable wheel on the front of the frame, a seat on the frame rearwardly of the axle, a steering handle connected to the steerable wheel and extending rearwardly over the frame to adjacent the seat, sprocket means on the axle secured to one main wheel to rotate same and pedal means on the frame connected to said sprocket means to drive the same, the main wheel on the axle opposite said driven main wheel rotating freely relatively to the driven wheel, a caster wheel on the rear of the frame spaced upwardly from road contact relative to the other wheels, giving a third point support for the vehicle and a rider thereon when tilted back, to raise the steerable wheel from road contact for movement of the vehicle in a circle by the driving means.

(References on following page)

References Cited in the file of this patent

UNITED STATES PATENTS

| | | |
|---|---|---|
| 1,472,375 | Stuart et al. | Oct. 30, 1923 |
| 1,493,496 | Morris | May 13, 1924 |
| 1,623,400 | Englund | Apr. 5, 1927 |
| 1,682,764 | Mohr | Sept. 4, 1928 |
| 1,777,781 | Biagi | Oct. 7, 1930 |
| 2,481,683 | Polacek | Sept. 13, 1949 |
| 2,660,442 | Wiesner et al. | Nov. 24, 1953 |